United States Patent
Hollander et al.

(10) Patent No.: US 10,650,275 B2
(45) Date of Patent: *May 12, 2020

(54) METHOD FOR DETECTION OF TEMPORAL PATTERN ANOMALIES IN VIDEO STREAMS

(71) Applicant: Chiral Software, Inc., Beverly Hills, CA (US)

(72) Inventors: Eric Jonathan Hollander, Beverly Hills, CA (US); Michael Travis Remington, Seattle, WA (US)

(73) Assignee: Chiral Software, Inc., Beverly Hills, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/130,532

(22) Filed: Sep. 13, 2018

(65) Prior Publication Data
US 2020/0089993 A1 Mar. 19, 2020

(51) Int. Cl.
*G06K 9/62* (2006.01)
*G06K 9/00* (2006.01)
*G06N 3/04* (2006.01)

(52) U.S. Cl.
CPC ....... *G06K 9/6218* (2013.01); *G06K 9/00744* (2013.01); *G06N 3/0418* (2013.01); *G06K 2009/00738* (2013.01)

(58) Field of Classification Search
CPC ............. G06K 9/6218; G06K 9/00744; G06K 2009/00738; G06N 3/0418
See application file for complete search history.

(56) References Cited

U.S. PATENT DOCUMENTS

| | | | |
|---|---|---|---|
| 8,167,430 B2 | 5/2012 | Cobb et al. | |
| 8,180,105 B2 | 5/2012 | Cobb et al. | |
| 9,111,148 B2 | 8/2015 | Seow et al. | |
| 2012/0294511 A1 | 11/2012 | Datta et al. | |
| 2016/0328654 A1 | 11/2016 | Bauer et al. | |
| 2017/0220887 A1 | 8/2017 | Fathi et al. | |
| 2019/0205649 A1* | 7/2019 | Ananthanarayanan | G06K 9/00711 |
| 2019/0325227 A1* | 10/2019 | Smith | G06K 9/00758 |

OTHER PUBLICATIONS

International Search Report and Written Opinion in co-pending PCT Application PCT/US2019/047632 dated Nov. 18, 2019.

* cited by examiner

*Primary Examiner* — Nizar N Sivji
(74) *Attorney, Agent, or Firm* — Young Basile Hanlon & MacFarlane, P.C.

(57) ABSTRACT

A method for detecting temporal pattern anomalies in a video stream includes detecting an object in a current frame of the video stream, generating a processed current frame that contains the detected object, generating a feature representation of the processed current frame, clustering the feature representation in one or more primary clusters in a clustering space of the primary class, generating an information vector of the feature representation, that includes information regarding the primary class, the sub-class and one or more external factors associated with the feature representation, clustering each information vector into one or more secondary clusters, and reporting a next frame as an anomaly when a corresponding information vector is positioned outside a secondary cluster of a feature presentation of a previous frame.

20 Claims, 5 Drawing Sheets

METHOD FOR DETECTION OF TEMPORAL PATTERN ANOMALIES IN VIDEO STREAMS

FIELD OF THE DISCLOSURE

The present disclosure relates generally to object recognition systems, and more particularly to systems and methods for detection of temporal pattern anomalies in video streams.

BACKGROUND

Object recognition is a technology in the field of computer vision for finding and identifying objects in an image or video sequence. Typically, an object recognition model is a machine learning model related to computer vision and image processing that deals with detecting instances of semantic objects of a certain class (such as humans, buildings, or cars) in digital images and videos.

Convolutional Neural Network (CNN) is a type of premier algorithm used in the object recognition. A standard CNN consist of a series of layers that perform mathematical computations on an image. The recognizing and classifying of objects into fine grained categories requires a deep CNN with many layers. Each layer requires millions of floating point operations, and also requires memory access by corresponding Central Processing Unit (CPU).

Anomaly detection is an unsupervised learning task where the goal is to identify abnormal patterns or motions in video data that are by definition, infrequent or rare events. However, a key aspect of an anomaly is not just that it is rare, but that it breaks the pattern. Negative anomalies are situations in which something fails to happen, which would have normally have happened. An existing anomaly detection system detects visual anomalies in video streams by first implementing a series of convolutional layers to produce a feature representation of the visual input, and then clustering each representation in one or more clusters in such a way that objects in the same cluster are more similar to each other than to those in other clusters. If a frame appears outside of a cluster, it is considered an anomaly.

However, existing anomaly detection systems are only good at detecting out of place objects, for example, a car driving on a pedestrian path. They do not consider long-term patterns, for example, the changing of the guard at Buckingham Palace occurs at a regular time each day and an existing anomaly detection system may consider the red coated guards an anomaly every day, because they do not look like most tourists. Further, existing anomaly detection systems do not detect negative anomalies. Also, such systems produce images with highlights of the anomalous object, but do not provide text labels that identify the object.

In view of the above, there is a need for an anomaly detection technique in object recognition systems, that is less computationally complex and has increased speed and accuracy. The anomaly detection technique should be able to detect negative anomalies, and provide text labels that identify the anomalous objects. Such object recognition system should allow for smooth object-recognition output on less powerful hardware such as edge devices and small computers that lack Graphic processing units (GPUs), so as to save computational resources and electricity costs, and therefore achieve longer operating time, especially on battery operated portable devices.

SUMMARY

In an embodiment of the present disclosure, a method for detecting temporal pattern anomalies in a video stream includes receiving the video stream from a camera. The method may further include detecting an object in a current frame of the video stream and generating a processed current frame that contains the detected object. The method may further include determining a primary class of the detected object, and generating a feature representation of the processed current frame by a convolutional encoder. The method may further include clustering the feature representation in one or more primary clusters in a clustering space of the primary class, wherein the one or more primary clusters correspond to one or more sub-classes of the primary class. The method may further include generating an information vector of the feature representation, that includes information regarding the primary class, the sub-class and one or more external factors associated with the feature representation. The method may further include clustering each information vector into one or more secondary clusters, and reporting a next frame as an anomaly when a corresponding information vector is positioned outside a secondary cluster of an information vector of a previous frame.

In another embodiment of the present disclosure, a system for detecting temporal pattern anomalies in a video stream includes an image input module configured to receive the video stream from a camera, and an object detection module configured to detect an object in a current frame of the video stream, generate a processed current frame that contains the detected object, and determine a primary class of the detected object. The system may further include a convolutional encoder configured to generate a feature representation of the processed current frame, and a primary clustering module configured to cluster the feature representation in one or more primary clusters in a clustering space of the primary class, wherein the one or more primary clusters correspond to one or more sub-classes of the primary class. The system may further include a vector generation module configured to generate an information vector of the feature representation, that includes information regarding the primary class, the sub-class and one or more external factors associated with the feature representation. The system may further include an anomaly clustering module configured to cluster each information vector of the video stream into one or more secondary clusters, and report a next frame as an anomaly when a corresponding information vector is positioned outside a secondary cluster of an information vector of a previous frame.

In yet another embodiment of the present disclosure, a computer programmable product for detecting temporal pattern anomalies in a video stream comprises a set of instructions. The set of instructions when executed by a processor causes the processor to receive the video stream from a camera, detect an object in a current frame of the video stream and generate a processed current frame that contains the detected object, determine a primary class of the detected object, generate a feature representation of the processed current frame by a convolutional encoder, cluster the feature representation in one or more primary clusters in a clustering space of the primary class, wherein the one or more primary clusters correspond to one or more sub-classes of the primary class, generate an information vector of the feature representation, that includes information regarding the primary class, the sub-class and one or more external factors associated with the feature representation, cluster each information vector of the video stream into one or more secondary clusters, and report a next frame as an anomaly when a corresponding information vector is positioned outside a secondary cluster of an information vector of a previous frame.

Various embodiments of the present disclosure incorporate a broad range of external knowledge in its cluster learning to assist in knowing what an anomaly is, in the video streams. Existing anomaly detection systems take a blank slate view of the world and focusses on short-term (a few frames of video) anomalies and so do not incorporate real-world knowledge. In an example, existing anomaly detection systems may look at a few frames, and may not realize that people sitting in a cafe at 3 am (outside of business hours) drinking coffee is an anomaly, as people sitting inside a cafe drinking coffee is normal during business hours, but may not be normal outside of business hours. Whereas, various embodiments of the present disclosure takes into account of various key aspects of real-world knowledge such as pre-defined categories of important objects (person, car, dog, etc.) and external factors such as time of day, day of week, weekday/weekend, business open/closed, holiday/not holiday status, day/night status, weather input (clear, cloudy, rainy, etc.), and other data. Further, unlike prior approaches which use pre-trained weights in an unsupervised manner, the present disclosure recognizes and classifies known objects in the frame before clustering.

Various embodiments of the present disclosure may find application in edge devices like drones and security cameras, which cannot stream data to a server for processing, do not have a high bandwidth network connection and do not have expensive and specialized GPU based hardware for complex computations, but the user needs to have a live camera view all the time.

BRIEF DESCRIPTION OF DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present disclosure.

There may be additional components described in the foregoing application that are not depicted on one of the described drawings. In the event, such a component is described, but not depicted in a drawing, the absence of such a drawing should not be considered as an omission of such design from the specification.

As required, detailed embodiments of the present disclosure are disclosed herein; however, it is to be understood that the disclosed embodiments are merely exemplary of the disclosure, which can be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure. Further, the terms and phrases used herein are not intended to be limiting but rather to provide an understandable description of the disclosure.

Figure 1:
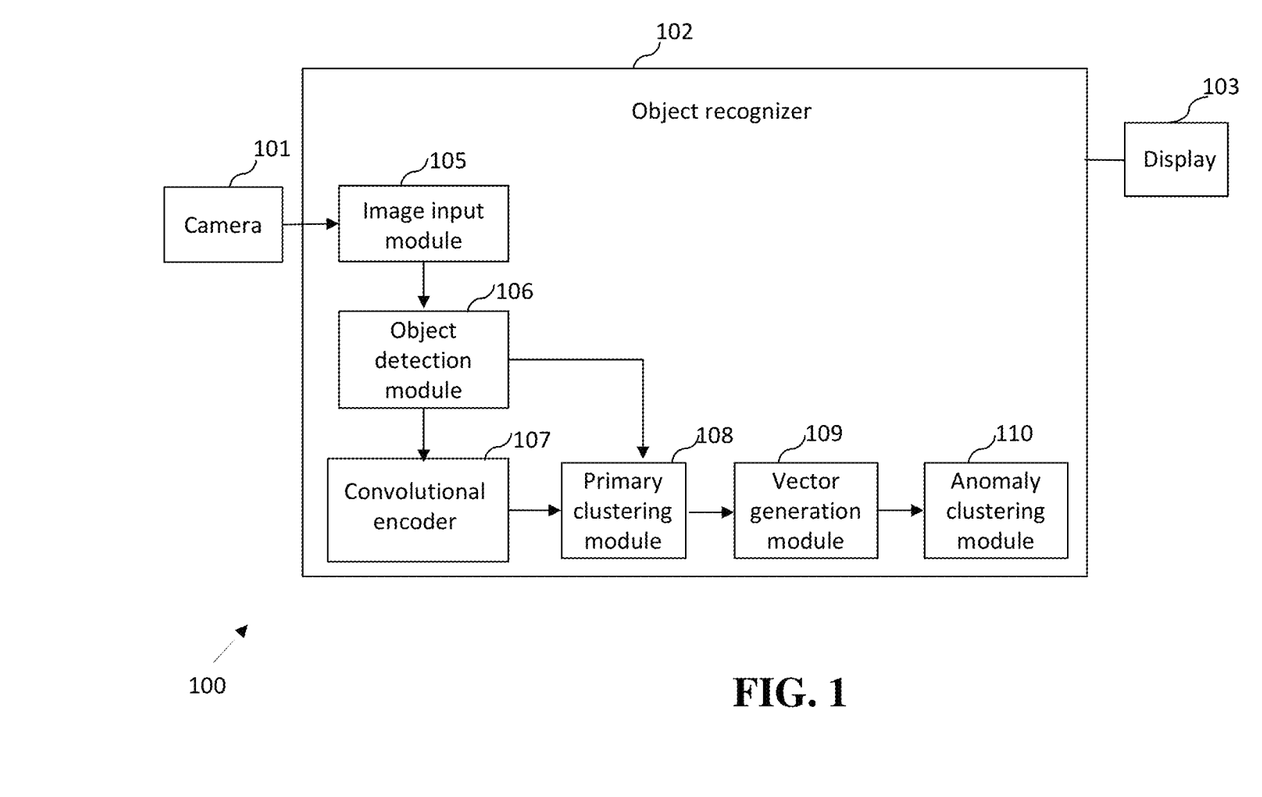
FIG. 1 is a schematic block diagram illustrating a system for detecting temporal pattern anomalies in a video stream, in accordance with an embodiment of the present disclosure.

Referring now to FIG. 1, a schematic block diagram of a system 100 for detecting temporal pattern anomalies in a video stream, in accordance with an embodiment of the present disclosure, is shown. The system 100 includes a camera 101, an object recognizer 102, and a display 103. The object recognizer 102 is configured to detect temporal pattern anomalies in a video stream captured by the camera 101, and display the detection results on the display 103. Examples of the display 103 include, but are not limited to, an LCD display, an LED display, or the like.

The object recognizer 102 is connected to the camera 101 either physically through a universal serial bus (USB), or through a communication network. The communication network may be any suitable wired network, wireless network, a combination of these or any other conventional network, without limiting the scope of the present disclosure. Few examples may include a Local Area Network (LAN), wireless LAN connection, an Internet connection, a point-to-point connection, or other network connection and combinations thereof.

The camera 101 is configured to capture and store the video of one or more objects in real-time. Examples of the camera 101 include, but are not limited to a remote battery-powered surveillance camera, a home security camera with a remote control via a home computer or a phone application, a traffic camera, a home doorbell camera, a body camera for soldiers or law enforcement, and a camera on an unmanned aerial vehicle (UAV).

In an embodiment, the camera 101, the object recognizer 102, and the display 103 may be integrated in a single device, where the single device is a portable smartphone having a built-in camera and a display.

In another embodiment, the camera 101 and the display 103 may be external to the object recognizer 102 and coupled thereto through the communication network, where the object recognizer 102 is a custom Graphic processing unit (GPU) server software to provide real-time object detection for all cameras on a local network.

In yet another embodiment, the camera 101 may be an IP camera external to the object recognizer 102 and the display 103, and coupled thereto through the communication network.

In an embodiment of the present disclosure, the object recognizer 102 includes an image input module 105, an object detection module 106, a convolutional autoencoder 107, a primary clustering module 108, a vector generation module 109, and an anomaly clustering module 110.

In an embodiment, each of the six components 105-110 could exist on a single physical computer, or on more than one computer and communicate through messaging protocols. If the six components run on a single computer, they could run in separate processes that communicate via communication protocols. If they run within a single process, they might run as threads. A thread is the smallest unit of processing that can be performed in an operating system. In most modern operating systems, a thread exists within a process, that is, a single process may contain multiple threads. If running in a single process, they could also use a reactive design, enabling the components to share one or more threads. The components 104-108 may be implemented in a programming language.

The image input module 105 is configured to receive a stream of image frames from the camera 101 and provide each image frame to the object detection module 106. The object detection module 106 includes a machine learning model related to computer vision and image processing that deals with detecting instances of semantic objects of a certain class (such as humans, buildings, or cars) in digital images and videos. This type of machine learning algorithm uses an advanced real-time variant of open-source object detection algorithm. An example of the object detection module 106 is You only look once (YOLO), which is a state-of-the-art, a real-time object detection system. Within the object detection module 106, each received frame is processed and a list of detected objects is created. This list includes confidence values and locations, which could be bounding box coordinates or more precise location information of each detected object. The object detection module 106 also generates a label (class) that may be displayed next to each object's location. The returned coordinates may be used to draw bounding boxes around each detected object.

In an embodiment of the present disclosure, the object detection module 106 crops the input image frames based on the detected objects, so as to generate cropped image frames that contain the detected objects. In another embodiment of the present disclosure, the object detection module 106 outputs a class/label of each detected object. The object detection module 106 thus, generates two outputs for each image frame: a cropped or masked image of a detected object, and a generic label/class of the detected object.

In an example, the object detection module 106 first crops/masks an image frame based on the detected object, and then classifies the detected object based on foreground/background detection, into one or more generic classes such as "vehicle", "person", an "unknown", or an "other".

The cropped image frame, and corresponding broad class may be transmitted by the object detection module 106 as two separate messages.

In an embodiment of the present disclosure, the object detection module 106 is trained with good basic knowledge about broad classes of various application areas, and has semantic knowledge of the content of a frame. For example, for a typical security system, the broad classes would be person, car, etc., and for an underwater system, the classes might be different.

The convolutional encoder 107 includes a series of convolutional layers to produce a feature representation of the cropped image frame generated by the object detection module 106. The convolutional layers are a type of neural network that are configured to encode visual information of the cropped image frame into a feature representation. The feature representation is a tensor generated by a neural network that contains learned relevant information about the input.

Figure 2:
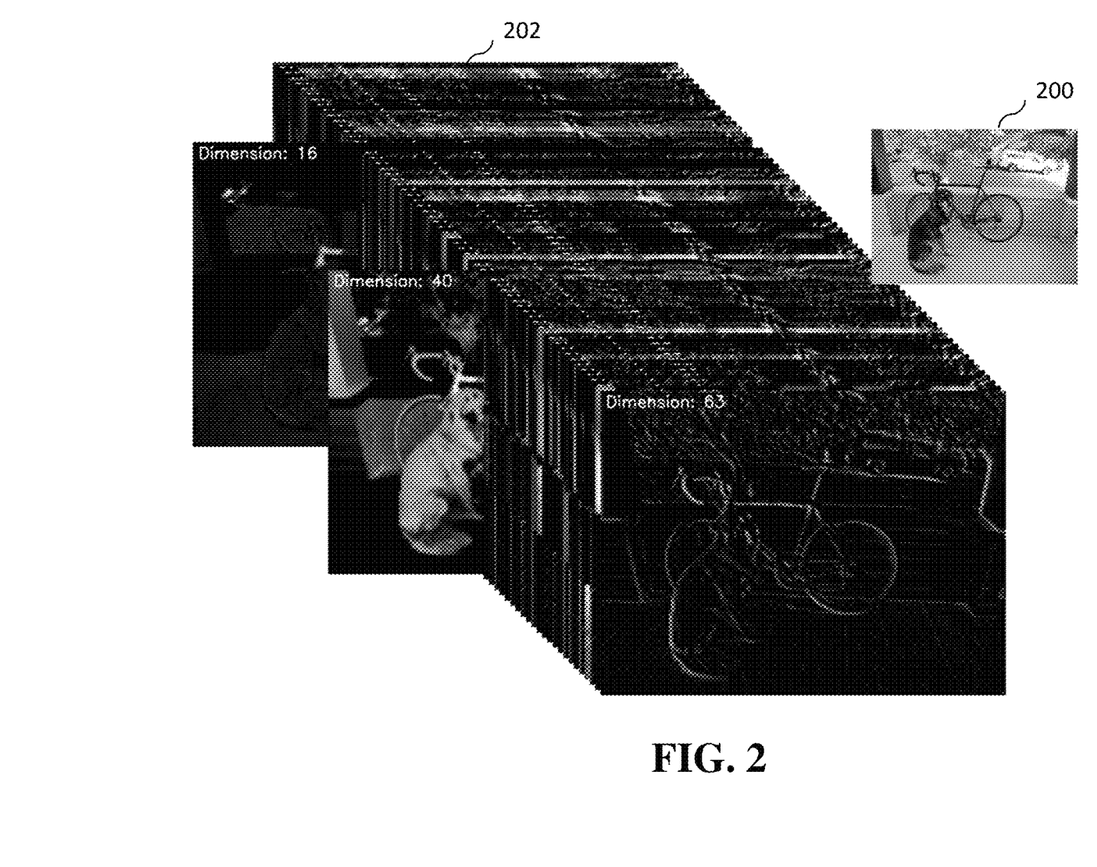
FIG. 2 illustrates an exemplary feature representation of an image.

Each convolutional layer includes a filter that scans for learned features such as edges. A feature representation is a tensor combining the output of all these filters. It is a tensor of numbers that represents whatever the convolutional neural network 'learned' was most important in the image. An exemplary feature representation 202 of an image frame 200 has been illustrated with reference to FIG. 2.

Referring back to FIG. 1, the primary clustering module 108 includes an N-dimensional clustering space for each primary class, which implies that within a clustering space of a broad class, different clusters may be formed indicative of different sub-classes of the primary class. For example, if the object detection module 106 detects 'car', 'bicycle', and 'truck', then there would be three primary clustering spaces. This means that there would be 3 clustering models, and each may automatically learn sub-categories within the 3 classes. Further, within each primary clustering space, there will be N dimensions corresponding to the shape of the feature representation that is clustered.

In an embodiment of the present disclosure, the primary clustering module 108 is configured to receive the primary class of a detected object from the object detection module 106, and cluster the feature representation of the detected object in the clustering space of the broad class, based on corresponding sub-class. In an example, the clustering space for "car" might cluster the detected cars into separate groups according to make, model, etc. Further, clustering may become specific to individual cars, so the cluster would learn about Car 1, Car 2, etc. These may correspond to specific cars which the system is used to seeing. The primary clustering module 108 is configured to automatic learn of regularly viewed categories, such as learning which persons are frequently seen at a location, and identifying them as Person 1, Person 2, etc.

Figures 3A, 3B:
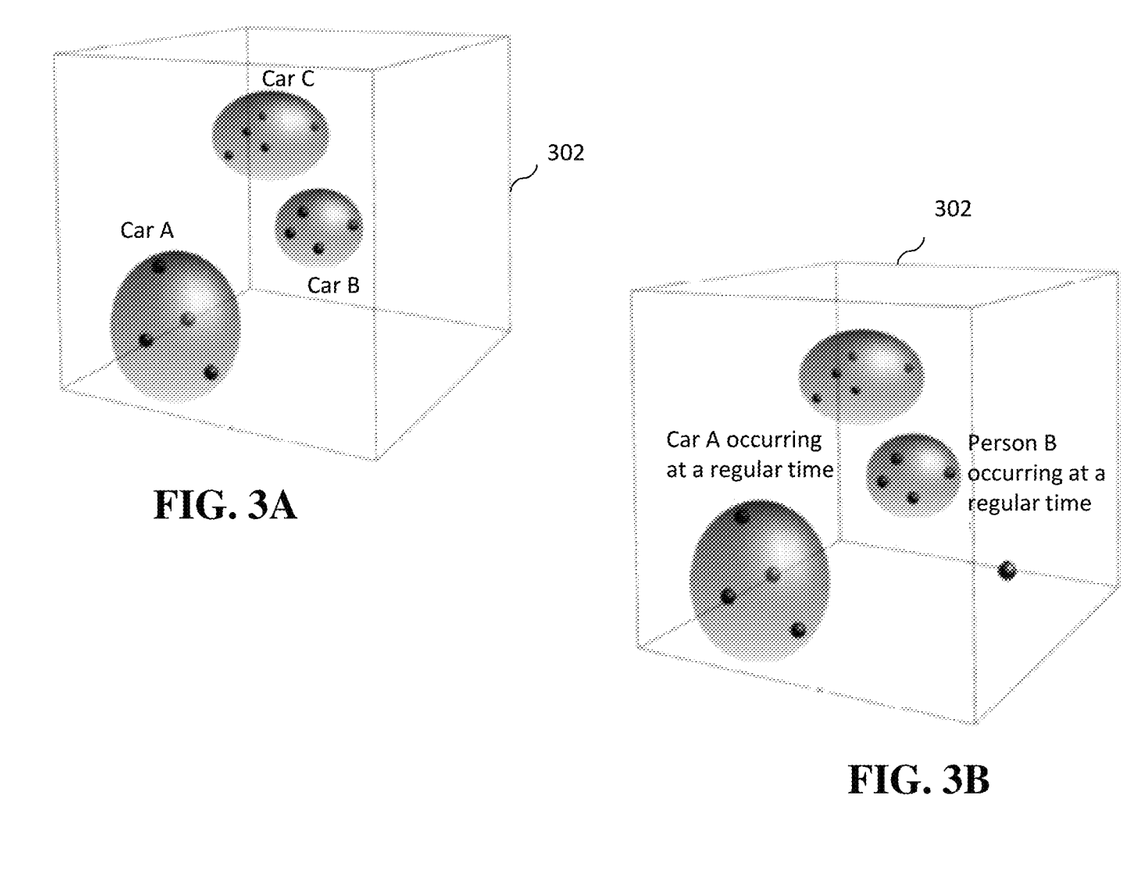
FIGS. 3A and 3B illustrate exemplary clustering spaces, in accordance with an embodiment of the present disclosure.

FIG. 3A illustrates an example of primary clustering for class 'car' in a primary clustering space 302. The many dimensions of the feature representation of the 'car' are represented herein, in three dimensions/three sub-classes of the 'car'. Each cluster is a sub-category of similar occurrences. In this case, each cluster could be a specific car, or a brand of car, and each black dot is an occurrence of the class.

Referring back to FIG. 1, the primary clustering module 108 transmits a cluster identification (ID) of a detected object to a vector generation module 109 along with any relevant information such as time, date, weather, or other contextual data. The vector generation module 109 generates an information vector based on the information provided by the primary clustering module 108.

The information vector is a set that contains a broad category/class of the detected object, the sub-category (cluster ID) and any other relevant information such as time, date, weather and other contextual data associated with corresponding image frame. Here is an example of the information vector and corresponding key:

Vector: [class number, cluster_id, minute of day, day, weekday, month]

Corresponding key: [24, 2, 812, 17, 5, 11]

Although, the information vector is shown to have six elements, it would be apparent to one of ordinary skill in the art, that the information vector may include less than or more than six elements. The vector generation module 109 provides the information vector to the anomaly clustering module 110.

The anomaly clustering module 110 is configured to cluster the corresponding information vectors into one or more secondary clusters. In anomaly clustering, each variable in the information vector is a clustering dimension. Thus, the anomaly clustering module 110 is configured to cluster the information vector based on corresponding class, sub-class, and context information (date, time, etc.). The anomaly clustering module 110 is further configured to report a current frame as an anomaly if a corresponding information vector is positioned outside a secondary cluster of a previous frame. Thus, the anomaly clustering module 110 takes into account of the class, sub-class, and context information (date, time, etc.) of the video stream to determine if the appearance of the object at that time is an anomaly.

In an example, the anomaly clustering is useful when a particular vehicle (sub-category of vehicles) has to be monitored. That is, the specific details of a particular event, i.e., "what and where" something occurred within a scene, such as a particular vehicle (car A) moved to a location that is believed to be a parking space (parking space 5) at 9:43 AM. The same clustering-within-primary classes process learns to identify a set of familiar objects-within-primary classes. This could be used to automatically construct "stories". For example, a story might be, "This morning, we saw persons 2, 6, and 9, and car 3, and two unknown cars."

In another example, it is rare to see a vehicle on the pedestrian walkaway, so it may appear outside any regular cluster. This means, it is an anomaly.

In another embodiment of the present disclosure, the anomaly clustering module 110 is configured to detect negative anomalies in a video stream. For example, the Buckingham Palace guard changes every day at 11 am unless it's raining. If the Buckingham Palace guard didn't change at 11 am on a sunny day, the anomaly clustering module 110 may detect and report it as a negative anomaly.

FIG. 3B illustrates an example of an anomaly clustering for multiple classes in a secondary clustering space 304. In an example, the information vector may be represented as:

Vector Key: [class number, cluster_ID, minute of day, day, weekday, month]
Vector: [24, 2, 812, 17, 5, 11]

Each field in this information vector becomes a dimension in the anomaly clustering. So in this example, anomaly clustering will occur over 6 dimensions, because the vector being clustered is of shape [1,6]. Data points that are similar across these six variables may be clustered together. If two different cars are spotted at the same time, five of the six variables will be the same (all but cluster_ID), so they would be clustered together in the time, date, and class dimensions of the clustering space.

In an example scenario for this diagram, the camera could be placed in the driveway of a home. The many dimensions of the feature representation of the information vector may be represented here in three dimensions. Each dot is an occurrence of a sub-category. Its position is dependent on the variables in the information vector such as date, time, class, and sub-category (cluster ID). Each cluster is a group of similar occurrences. The lone data point is an anomaly, because it does not belong to any established group. The two labeled clusters show the learned patterns of car A and person B. Car A could be the homeowner's car, and person B could be the person who regularly drives the car, the homeowner. The unlabeled cluster could be person A, the homeowner's wife occurring at regular times. The lone anomalous data point could be a wild animal crossing the driveway, or an unwelcome person such as a burglar.

Instead of arbitrary features, the convolutional auto-encoder 107 automatically learns what visual features are most critical to the clustering engine. These features are represented in a tensor of values fine-tuned by the auto-encoder. This is the advantage of the deep-learning based approach. Each convolutional layer includes a filter that scans for learned features such as edges. A feature representation is a tensor combining the output of all these filters.

The object recognizer 102 may transmit the object recognition results to other components for further processing, storage, or such as the user interface for display. In an example, the coordinates and label of recognized objects may be sent as a message along with the video frames, to display labels and/or bounding boxes on live video streams on the display 103, or the coordinates and labels may be stored with the frames, or used for transmitting alerts, or other purposes. In one embodiment, the object recognizer 102 may generate a video output for display in which bounding boxes are drawn around detected objects, and/or a pixel mask is formed on the exact object detected, or substantially exact object detected.

Figure 4:
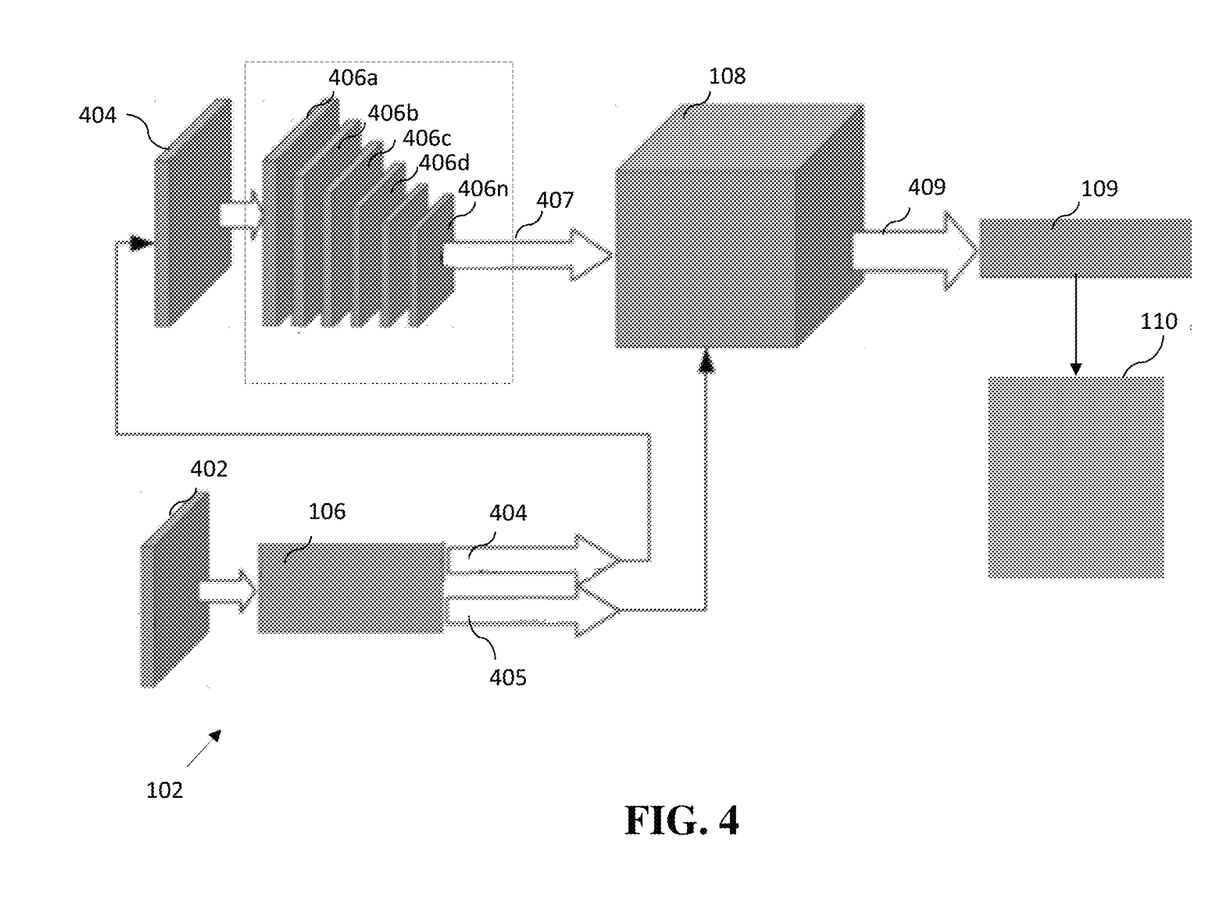
FIG. 4 illustrates a detailed view of the object recognizer of FIG. 1, in accordance with an embodiment of the present disclosure.

FIG. 4 illustrates a detailed view of the object recognizer 102, in accordance with an embodiment of the present disclosure.

The object detection module 106 receives an input image frame 402, and generates a cropped/masked image frame 404 of detected object, and a broad class 405 of corresponding detected object, as two separate outputs.

The cropped image frame 404 is provided to a convolutional encoder 404 that includes first through nth convolutional layers 406a till 406n (hereinafter collectively referred to as convolutional layers 406). The convolutional layers 406 are multiple processing layers, where each top layer processes an output generated by corresponding bottom layer. The convolutional layers 406 may be trained to look for relevant information.

The bottom most layer is an input layer 406a that receives the cropped frame 404. The layer above the input layer 406a is a first processing layer 406b that may process the cropped frame. The top-most layer 406n generates a feature representation 407 of the cropped image frame. Although, six processing layers have been illustrated herein for the sake of brevity, it would be obvious to one of ordinary skill in the art, that the number of processing layers may be greater than or less than six.

It may be noted that the function of the convolutional auto-encoder 404 is different from the object detection module 106, though they both use convolutional layers. The object detection module 106 finds objects within a frame, whereas the auto-encoder 404 takes these found objects and transforms them into a format that the primary clustering module 108 can work with more efficiently. The auto-encoder 404 encodes a cropped image into a numerical tensor, representing relevant visual features that distinguish the object. Each convolutional layer of the auto-encoder 404 includes a filter of weights that slides over the image, and performs multiplication over each image patch. Each of these filters detect different primitive features such as edges.

The primary clustering module 108 is configured to cluster the feature representation 407 of the detected object in the clustering space of the broad class, based on corresponding sub-class. Thereafter, the primary clustering module 108 transmits a cluster identification (ID) 409 of a detected object to a vector generation module 109 along with any relevant information such as time, date, weather, or other contextual data. The vector generation module 109 generates an information vector based on the information provided by the primary clustering module 108, and transmits the same to the anomaly clustering module 110. The anomaly clustering module 110 is configured to cluster the information vector based on corresponding class, sub-class, and context information (date, time, etc.), and report a current frame as an anomaly if a corresponding information vector is positioned outside a secondary cluster of a previous frame.

Applications of the Present Disclosure:

A UAV may install the system of the present disclosure to detect objects that come in its way in real-time and make navigation decisions in real-time based on detected objects.

A drone, with an existing single camera sensor may install the system of the present disclosure to more accurately recognize objects.

A government or corporate facility installs the system of the present disclosure with edge processing. An attacker comes in with a weapon. The system, in real time, identifies a visible weapon (a rifle etc) and alerts security. The security team arrives and uses their smartphones to get real-time views from the security cameras. Due to the real-time edge processing, the application shows the responders only the relevant images to see, out of the hundreds of cameras that may be in the building.

Quality control in a restaurant kitchen: For example, a commercial kitchen robot which prepares hamburgers. The present disclosure would learn from experience, what a completed hamburger looks like. If at one point, a hamburger was viewed that was missing a bun, that would be an anomaly and the system would recognize that, without training. Of course, not all anomalies are wrong; it could be in this case that a customer didn't want a bun.

Figure 5:
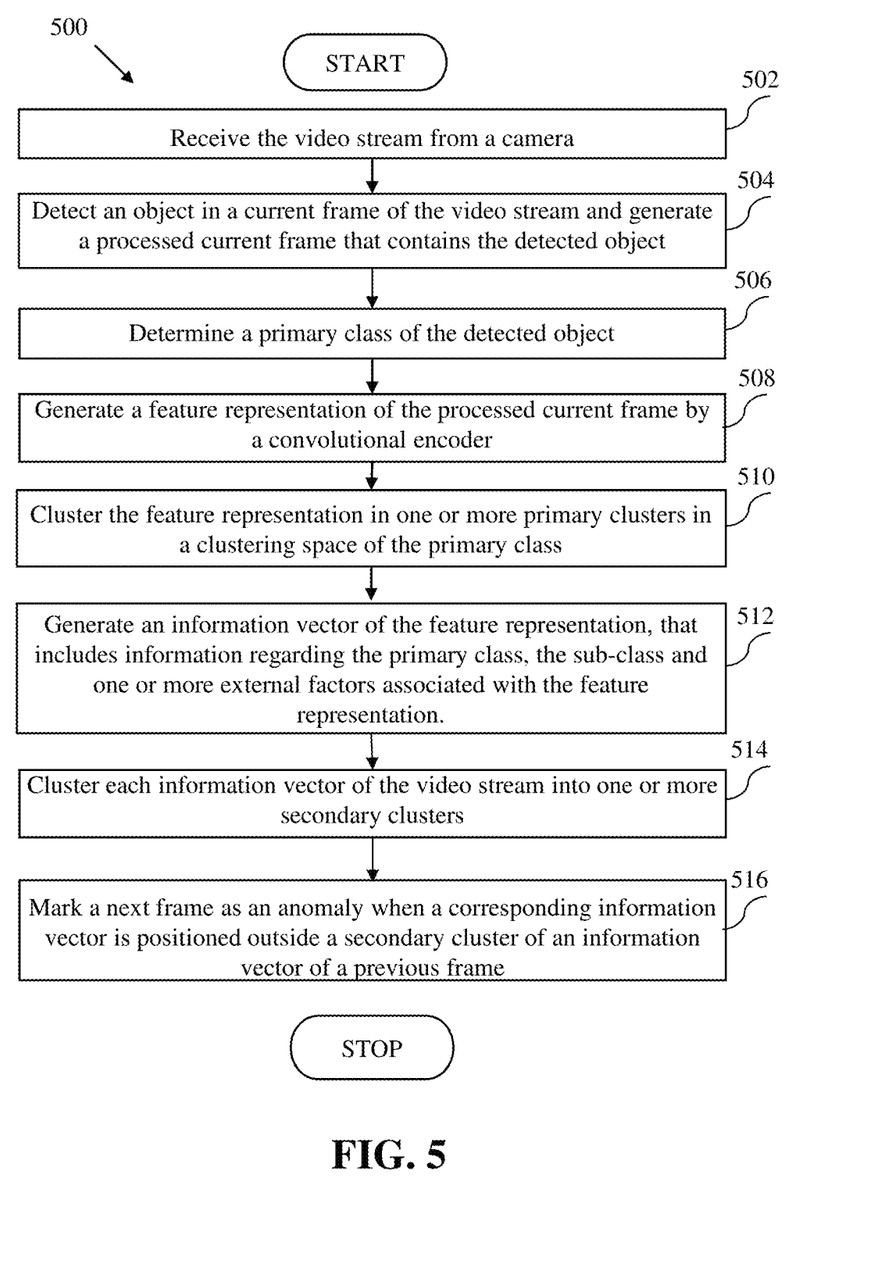
FIG. 5 is a flow chart to illustrate a method for detecting temporal pattern anomalies in a video stream, in accordance with an embodiment of the present disclosure.

FIG. 5 is a method flowchart 500 for detecting temporal pattern anomalies in a video stream, in accordance with an embodiment of the present disclosure. Some steps may be discussed with respect to the system as shown in FIG. 1.

At step 502, the video stream is received from a camera. Examples of the camera include, but are not limited to a remote battery-powered surveillance camera, a home security camera with a remote control via a home computer or a phone application, a traffic camera, a home doorbell camera, a body camera for soldiers or law enforcement, and a camera on an unmanned aerial vehicle (UAV).

At step 504, an object is detected in a current frame of the video stream and a processed current frame is generated that contains the detected object. The processed frame could be either a cropped image or a masked image of the current frame.

At step 506, a primary class of the detected object is determined. Once the object is detected, the image frame is first cropped/masked based on the detected object, and then the detected object is classified based on foreground/background detection, into one or more primary classes such as "vehicle", "person", an "unknown", or an "other".

At step 508, a feature representation of the processed current frame is generated by a convolutional encoder. The convolutional encoder includes a series of convolutional layers to produce a feature representation of the cropped image frame. The convolutional layers are a type of neural network that are configured to encode visual information of the cropped image frame into a feature representation. The feature representation is a tensor generated by a neural network that contains learned relevant information about the input.

At step 510, the feature representation is clustered in one or more primary clusters in a clustering space of the primary class, wherein the one or more primary clusters correspond to one or more sub-classes of the primary class. In an example, the clustering space for "car" might cluster the detected cars into separate groups according to make, model, etc.

At step 512, an information vector of the feature representation is generated, that includes information regarding the primary class, the sub-class and one or more external factors associated with the feature representation. The external factors include, the primary class, the sub-class, time, date, weather and other contextual data.

At step 514, each information vector of the video stream is further clustered into one or more secondary clusters by an anomaly clustering module. In anomaly clustering, each variable in the information vector is a clustering dimension.

At step 516, a next frame is reported as an anomaly when a corresponding information vector is positioned outside an information vector of a previous frame.

The present disclosure may be implemented in the form of a computer programmable product for performing real-time recognition of objects. The computer programmable product includes a set of instructions, the set of instructions when executed by a processor causes the processor to perform the methods as discussed with FIG. 5.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor and a memory may be used to implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without deviating from the scope of present disclosure.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

We claim:

1. A method for detecting temporal pattern anomalies in a video stream, the method comprising:
   receiving the video stream from a camera;
   detecting an object in a current frame of the video stream and generating a processed current frame that contains the detected object;
   determining a primary class of the detected object;
   generating a feature representation of the processed current frame by a convolutional encoder;
   clustering the feature representation m one or more primary clusters in a clustering space of the primary class, wherein the one or more primary clusters correspond to a sub-class of the primary class;

generating an information vector of the feature representation, that includes information regarding the primary class, the sub-class of the primary class, and one or more external factors associated with the feature representation;
clustering each information vector of the video stream into one or more secondary clusters, wherein each variable in the information vector is a clustering dimension; and
reporting a next frame as an anomaly when a corresponding information vector is positioned outside a secondary cluster of the one or more secondary clusters, of an information vector of a previous frame.

2. The method as claimed in claim 1 further comprising determining a cluster identification (ID) of the feature representation based on a corresponding sub-class of the primary class.

3. The method as claimed in claim 2, wherein the information vector of a feature representation is a set containing a corresponding class number, a cluster identification (ID), a date, minute of day, a day, a month, a year, and a weather associated with corresponding image frame.

4. The method as claimed in claim 1, wherein the camera is selected from at least one of: a traffic camera, a home doorbell camera, a body camera for soldiers or law enforcement, and a camera on an unmanned aerial vehicle (UAV).

5. The method as claimed in claim 1, wherein the processed current frame is a cropped image of the current frame.

6. The method as claimed in claim 1, wherein the processed current frame is a masked image of the current frame.

7. The method as claimed in claim 1, wherein the convolutional encoder includes a series of convolutional layers to produce a feature representation of the processed current frame, wherein the feature representation is a tensor generated by a neural network that contains learned relevant information about the current frame.

8. The method as claimed in claim 1 further comprising detecting a negative anomaly in the video stream when a regular event ceases.

9. A system for detecting temporal pattern anomalies in a video stream, the system comprising:
an image input module configured to:
receive the video stream from a camera;
an object detection module configured to:
detect an object in a current frame of the video stream;
generate a processed current frame that contains the detected object; and
determine a primary class of the detected object;
a convolutional encoder configured to:
generate a feature representation of the processed current frame;
a primary clustering module configured to:
cluster the feature representation in one or more primary clusters in a clustering space of the primary class, wherein the one or more primary clusters correspond to a sub-class of the primary class;
a vector generation module configured to:
generate an information vector of the feature representation, that includes information regarding the primary class, the sub-class of the primary class, and one or more external factors associated with the feature representation; and
an anomaly clustering module configured to:
cluster each information vector of the video stream into one or more secondary clusters wherein each variable in the information vector is a clustering dimension; and
report a next frame as an anomaly when a corresponding information vector is positioned outside a secondary cluster of the one or more secondary clusters of an information vector of a previous frame.

10. The system as claimed in claim 9, wherein the primary clustering module is configured to determine a cluster identification (ID) of the feature representation based on a corresponding sub-class of the primary class.

11. The system as claimed in claim 9, wherein the information vector of a feature representation is a set containing a corresponding class number, a cluster identification (ID), a date, minute of day, a day, a month, a year, and a weather associated with corresponding image frame.

12. The system as claimed in claim 9, wherein the camera is selected from at least one of: a traffic camera, a home doorbell camera, a body camera for soldiers or law enforcement, and a camera on an unmanned aerial vehicle (UAV).

13. The system as claimed in claim 9, wherein the processed current frame is a cropped image of the current frame.

14. The system as claimed in claim 9, wherein the processed current frame is a masked image of the current frame.

15. The system as claimed in claim 9, wherein the convolutional encoder includes a series of convolutional layers to produce a feature representation of the processed current frame, wherein the feature representation is a tensor generated by a neural network that contains learned relevant information about the current frame.

16. The system as claimed in claim 9, wherein the anomaly clustering module is further configured to detect a negative anomaly in the video stream when a regular event suddenly ceases.

17. A computer programmable product for detecting temporal pattern anomalies in a video stream, the computer programmable product comprising a set of instructions, the set of instructions when executed by a processor causes the processor to:
receive the video stream from a camera;
detect an object in a current frame of the video stream and generate a processed current frame that contains the detected object;
determine a primary class of the detected object;
generate a feature representation of the processed current frame by a convolutional encoder;
cluster the feature representation m one or more primary clusters in a clustering space of the primary class, wherein the one or more primary clusters correspond to a sub-classes of the primary class;
generate an information vector of the feature representation, that includes information regarding the primary class, the sub-class of the primary class, and one or more external factors associated with the feature representation;
cluster each information vector of the video stream into one or more secondary clusters, wherein each variable in the information vector is a clustering dimension; and
report a next frame as an anomaly when a corresponding information vector is positioned outside a secondary cluster, of the one or more secondary clusters of an information vector of a previous frame.

18. The computer programmable product as claimed in claim 17, wherein the set of instructions when executed by a processor causes the processor to determine a cluster identification (ID) of the feature representation based on corresponding sub-class.

19. The computer programmable product as claimed in claim 17, wherein the information vector of a feature representation is a set containing a corresponding class number, a cluster identification (ID), a date, minute of day, a day, a month, a year, and a weather associated with corresponding image frame.

20. The computer programmable product as claimed in claim 17, wherein the set of instructions when executed by a processor detect a negative anomaly in the video stream when a regular event suddenly ceases.

* * * * *